June 26, 1962 C. F. SIGMON ET AL 3,040,755
APPARATUS FOR CLEANING MILKING SYSTEMS
Filed Jan. 31, 1961
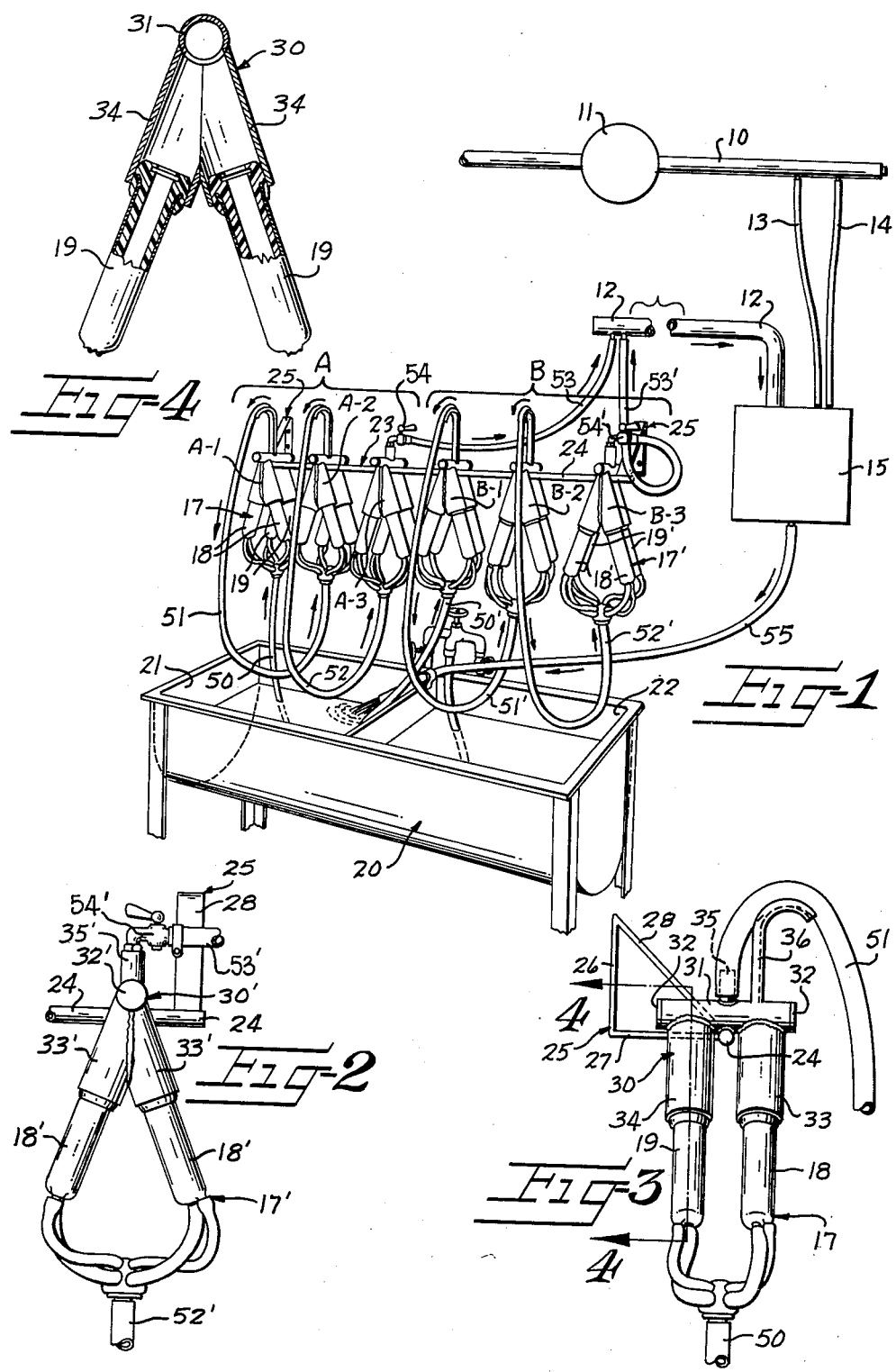

United States Patent Office 3,040,755
Patented June 26, 1962

3,040,755
APPARATUS FOR CLEANING MILKING SYSTEMS
Coyt F. Sigmon and Henry H. Sigmon, Jr., both of Rte. 1, Statesville, N.C.
Filed Jan. 31, 1961, Ser. No. 86,110
4 Claims. (Cl. 134—169)

This invention relates to an improved apparatus for cleaning milking sytems of the type utilizing a teat-cup unit comprising a plurality of teat-cup assemblies, wherein each of the teat-cup assemblies has first and second pairs of teat cups to be attached to the teats of animals, such as cows, for receiving milk which is conveyed through appropriate pipe-lines to a storage tank.

Pipe-line milking systems employing teat-cup assemblies have enjoyed extensive use because of their speed and efficiency in performing a milking operation, but the components of these milking systems must be repeatedly cleaned and sterilized after each milking operation to comply with stringent sanitation standards in effect throughout the country. In this respect, it is known that sediment from milk provides an ideal breeding ground for many forms of harmful bacteria and in the course of performing a milking operation with the pipe-line type of milking system, sediment from the milk necessarily is deposited in the teat cups and pipe-lines through which the milk passes. To insure proper sanitary conditions in operating the pipe-line milking system, therefore, the teat cups and other components of the milking system must be effectively cleaned and sterilized. In the past, this has meant the substantial dismantling of the milking system so that the various components thereof coming in contact with milk could be cleaned and sterilized—a tedious and time-consuming job.

It has been proposed to provide an apparatus for washing parts of a pipe-line milking system coming in contact with milk, wherein the apparatus may be incorporated in the milking system itself to perform its intended washing function without requiring the substantial dismantling of the milking system. Such a washing apparatus relies upon the vacuum pipe-line of the milking system, which is operably connected to the milk pipe-line and the teat-cup assemblies, together with suitable means for inducing a vacuum therein to create a suction effect drawing cleaning and sterilizing liquid through the teat-cup assemblies and the pipe-lines comprising the milking system. A washing apparatus of the type heretofore proposed would be likely to experience difficulty in achieving proper sanitary results when the number of teat-cup assemblies to be cleaned and sterilized is large. This difficulty can be traced to a lack of proper flushing action of the cleaning liquid, since it passes simultaneously through the teat cups of the several teat-cups assemblies. In this respect, the suction effect created in the milking system by the vacuum-inducing means is divided into many small components because of the large number of teat cups through which cleaning liquid is simultaneously drawn. Thus, while the rate of flow of the cleaning liquid through the milk pipe-line may be maintained at a satisfactory velocity to produce an adequate flushing action therein for properly cleaning the milk pipe-line, the rate of flow of the cleaning liquid in the region of the teat-cup assemblies is at a substantially reduced velocity, since the cleaning liquid is simultaneously drawn through the first and second pairs of teat cups of each of the several teat-cup assemblies. Under such circumstances, the flushing action of the cleaning liquid as it passes through the teat cups is likely to be inadequate and sediment from the milk lodged in crevices of the individual teat cups may be undisturbed by the weak flushing action of the cleaning liquid on the interior of the individual teat cups. Accordingly, the cleanliness of the teat-cup assemblies and their teat cups will be impaired which may result in a subsequent milking operation producing milk unfit for human consumption whereupon such milk must be discarded as failing to meet sanitation standards.

Moreover, apparatuses which have been heretofore proposed of the type to be incorporated in pipe-line milking systems for cleaning the milking systems are cumbersome and bulky, being designed to accept a particular number of teat-cup assemblies. Where less than the required number of teat-cup assemblies are to be cleaned and sterilized, it is necessary to render portions of such apparatuses inoperative by inserting suitable plugs in the unused openings of a teat-cup assembly mounting unit adapted to receive the individual teat cups of a teat-cup assembly. The insertion and removal of such plugs from the teat-cup assembly mounting unit is a nuisance, as a suitable number of plugs must be kept on hand for service, if needed. The plugs themselves are readily lost or misplaced, thereby adding to their undesirability.

It is a principal object of the present invention to provide an improved apparatus for cleaning the teat cups of a plurality of teat-cup assemblies, wherein the apparatus is incorporated in a pipe-line milking system utilizing a vacuum-inducing means for extracting milk from the teats of an animal to be drawn into a milk pipe-line through the teat cups, the apparatus including a plurality of tubular teat-cup mounting adaptors for receiving the first and second pairs of teat cups of each of the several teat-cup assemblies, and sections of tubing serially connecting each of the mounting adaptors and the teat-cup assembly corresponding thereto in the pipe-line milking system, whereby cleaning liquid is drawn from a tank through the tubing and progressively through each of the teat-cup assemblies in response to the inducing of a vacuum in the pipe-line milking system. Thus, the rate of flow of the cleaning liquid through each of the teat-cup assemblies is maintained at a relatively high velocity as contrasted to the reduced rate of flow of cleaning liquid when simultaneously drawn through the teat cups of all of the teat-cup assemblies as provided for in conventional apparatuses. Accordingly, the flushing action of the cleaning liquid for each of the teat-cup assemblies remains at a high level in our improved apparatus and succeeds in dislodging milk sediment from the individual teat cups which otherwise may not be removed by the relatively weak ineffectual flushing action exhibited by conventional apparatuses on the interiors of the teat cups.

It is a further object of this invention to provide an improved apparatus for cleaning a teat-cup unit of a milking machine comprising a plurality of teat-cup assemblies commonly known as claws wherein each of the claws has first and second pairs of teat cups. The improved apparatus includes a tank containing a supply of cleaning liquid and a rack disposed thereabove for suspending the claws in inverted position above the tank by means of tubular teat-cup mounting adaptors straddling the rack and having first and second pairs of tubular arms depending on opposite sides of the rack therebeneath for fluid-tight reception of the first and second pairs of teat cups of respective claws. Sections of tubing interconnect the sets of mounting adaptors and claws with the tank of cleaning liquid so as to permit cleaning liquid to be progressively drawn through the first and second pairs of teat cups of each of the claws by suction thereof from the tank. The teat-cup mounting adaptors are of light-weight construction and allow considerable variation in the number of claws which comprise the teat-cup unit to be cleaned at one time, inasmuch as mounting adaptors may be readily added or subtracted from the assembled apparatus to accommodate the desired number of claws.

It is a further object of this invention to provide an improved mounting adaptor for a teat-cup assembly to be employed in an apparatus for cleaning teat-cup assemblies, wherein the adaptor comprises a tubular base with closed ends and first and second pairs of tubular arms depending therefrom for reception of corresponding pairs of teat cups of the teat-cup assembly to be suspended in inverted position above a tank of cleaning liquid. This inverted suspension of the teat-cup assembly is accomplished by placing the adaptor in straddling relation on a rack above the tank, the base thereof being receivable in overlying engagement with the rack and the pairs of depending tubular arms extending beneath the rack on opposite sides thereof.

Some of the objects of the invention having been stated, other objects will appear as the description proceeds, when taken in connection with the accompanying drawings, in which—

FIGURE 1 is a perspective view, partially schematic in form, illustrating an apparatus constructed in accordance with the present invention as incorporated in a pipe-line milking system;

FIGURE 2 is a fragmentary side elevational view of one form of a mounting adaptor suspenuding a teat-cup assembly from the rack of FIGURE 1;

FIGURE 3 is an end elevational view of another form of mounting adaptor suspending a teat-cup assembly from the rack of FIGURE 1; and FIGURE 4 is a vertical sectional view taken along the line 4—4 in FIGURE 3.

Referring more specifically to the drawings, it will be understood that the present apparatus for cleaning and sterilizing components of an automatic milking system is normally intended to be incorporated in a pipe-line milking system of the type comprising a vacuum pipe-line 10 having means for inducing a vacuum therein in the form of a vacuum pipe 11. The vacuum pipe-line 10 is connected to a milk pipe-line 12 by a pair of branch vacuum pipe-lines 13, 14 which extend from the vacuum pipe-line 10 to a milk-receiving jar 15, one end of the milk pipe-line 12 also extending into the milk-receiving jar 15 to provide communication between the vacuum pipe-line 10 and the milk pipe-line 12. The degree of the vacuum induced in the vacuum pipe-line 10 by the vacuum pump 11 may be regulated by any suitable means (not shown) to achieve a satisfactory vacuum or sub-atmospheric pressure in the vacuum pipe-line 10 for carrying out a milking operation.

A milking operation employing a pipe-line milking system is carried on by means of a teat-cup unit distributed over a plurality of milking sites, each milking site including at least one teat-cup assembly of the teat-cup unit. The teat-cup assembly is characteristically referred to as a claw and has first and second pairs of teat cups to be affixed to the teats of an animal which is to be milked. Ordinarily, one end of a milk hose is attached to a claw at a point remote from its teat cups, the other end of the milk hose being connected to the milk pipe-line 12. Each claw is also connected to the vacuum pipe-line 10 in the usual manner to cause the teat cups of the claw to extract milk from the teats of an animal to which they are affixed in the well-known manner.

When a large number of teat-cup assemblies or claws, each of which has first and second pairs of teat cups, must be cleaned and sterilized, apparatuses of the type incorporated in such a pipe-line milking system as described above and heretofore employed for this purpose rely upon the suction effect created in the pipe-lines of the milking system by the vacuum pump 11 for simultaneously drawing cleaning liquid through the teat cups of each of the teat-cup assemblies. Under such circumstances, the reduction of the suction effect in the region of the teat cups which results from simultaneously bringing into play the teat cups of all of the teat-cup assemblies, each as an individual sucking agency, causes limited flushing action on the part of the cleaning liquid as it is drawn through the teat cups. It will be apparent that such weak flushing action may be responsible for leaving residual sediment in the teat cups to create an unsanitary condition.

The present invention contemplates an appaartus for cleaning teat-cup assemblies and pipe-lines of a pipe-line milking system in an improved manner by providing a convenient means for connecting the individual teat-cup assemblies in series in the milking system to progressively draw cleaning liquid through each of the teat-cup assemblies by means of the sub-atmospheric pressure maintained in the vacuum pipe-line 10 which induces a sucking effect beginning at one end of the series of teat-cup assemblies and continuing substantially undiminished through the remainder of the series. Full flushing action is therefore maintained as the cleaning liquid is progressively drawn through each of the teat-cup assemblies in the series. Thus, in accordance with the present invention the rate of flow of cleaning liquid through each of the teat-cup assemblies is substantially above that provided in apparatuses heretofore proposed for cleaning teat-cup assemblies in a pipe-line milking system and results in a more effective flushing action on the interiors of the teat cups to achieve substantially improved sanitation.

For purposes of illustration, it will be noted that FIGURE 1 discloses two separate teat-cup units A and B, each of which comprises a plurality of teat-cup assemblies or claws 17 and 17' respectively (three claws 17 and 17' in each teat-cup unit being shown). Since teat-cup units A and B are structurally identical and cooperate with our apparatus in the same manner, only teat-cup unit A will be specifically described in connection with the improved apparatus of the present invention, it being understood that a like description applies to teat-cup unit B. Also, elements of or relating to teat-cup unit B shall bear the same reference characters of the corresponding elements associated with teat-cup unit A with the prime notation added. Referring now to the apparatus for cleaning teat-cup unit A which comprises a plurality of teat-cup assemblies or claws 17 respectively having first and second pairs of teat cups 18, 18 and 19, 19, there is provided a vat or tank 20 preferably centrally partitioned to define two receptacles 21, 22. The receptacles 21 and 22 contain liquid solutions to be used in cleaning and sterilizing the teat-cup units A and B and the milk pipe-line 12 in a manner to be hereinafter described. For example, receptacle 21 may be provided with a detergent cleaning liquid and receptacle 22 may be provided with a sterilizing liquid or a rinsing solution for application to the teat-cup units A and B and the milk pipe-line 12 following the application of the cleaning liquid in receptacle 21.

A rack 23 is installed above the tank 20, the rack 23 comprising an elongated horizontally extending bar 24 which is supported at its opposite ends by suitable bracket members 25, 25 fixedly secured to a wall of a building, such as a milking barn, so as to dispose the rack 23 and its horizontally extending bar 24 in vertically spaced relationship above the tank 20. As shown in FIGURES 1 and 3, each of the bracket members 25 may comprise a vertical base plate 26 attached to the wall by suitable means, such as screws, a horizontal strut member 27 connected to the bottom of the vertical base plate 26 and extending transversely to the longitudinal axis of the bar 24, and an inclined strut member 28 connected to the upper end of the vertical base plate 26 and extending downwardly in converging relation to the horizontal strut member 27—the horizontal strut member 27 and the inclined strut member 28 forming a juncture with the bar 24 to provide adequate bracing support therefor.

The individual claws or teat-cup assemblies 17 included in the teat-cup unit A are adapted to be suspended from the rack 23 in inverted position above the tank 20 by respective teat-cup adaptor mounting means 30. Each of the teat-cup adaptor mounting means 30 and the claw 17 corresponding thereto comprise a teat-cup cleaning station identified in the drawings as teat-cup cleaning stations A-1, A-2, and A-3 of teat-cup unit A. Correspondingly, teat-cup unit B is provided with teat-cup cleaning stations B-1, B-2, and B-3. It will be observed that the teat-cup cleaning stations A-1 and A-2 correspond to the teat-cup cleaning stations B-1 and B-2, while station A-3 corresponds to station B-3. For this reason, only the teat-cup cleaning stations A-1, A-2, and A-3 of teat-cup unit A will be described to avoid repetitious descriptive matter, it being understood that teat-cup unit B and its teat-cup cleaning stations B-1, B-2, and B-3 may be similarly described.

Thus, it will be seen that the teat-cup adaptor mounting means 30 of teat-cup cleaning stations A-1 and A-2 comprises an elongated tubular base 31 overlying the horizontal rack bar 24 and having its opposite ends closed by plugs 32, 32 of suitable resilient material, such as rubber. First and second pairs of tubular arms 33, 33 and 34, 34 depend from the tubular base 31 on opposite sides of the horizontal rack bar 24, the first pair of tubular arms 33, 33 being disposed forwardly of the rack bar 24 and the second pair of tubular arms 34, 34 being disposed rearwardly of the rack bar 24 in FIGURE 1. It will be noted that the first and second pairs 33, 33 and 34, 34 of tubular arms depend from the tubular base 31 of the teat-cup mounting adaptor 30 in a divergent manner (FIGURE 4). A tubular connector means in the form of a tubular projection 35 extends upwardly from the tubular base 31 of the teat-cup mounting adaptor 30 intermediate its ends for reception of tubing or hose means as hereinafter described. The teat-cup mounting adaptor 30 of cleaning stations A-1 and A-2 also includes hose support means in the form of an upwardly extending support standard 36 affixed to the tubular base 31 adjacent to the vertical projection 35 and having an arcuately curved upper end disposed above the tubular base 31 of the mounting adaptor 30, the support standard 36 having a semi-circular cross-section for reception of tubing or hose means affixed to the tubular projection 35 of the mounting adaptor 30 to properly support the tubing or hose means for preventing kinking thereof.

It will be noted that the mounting adaptor 30 of teat-cup cleaning station A-3 includes a tubular connector means in the form of a vertical tubular projection 35 centrally disposed on the tubular base 31 for reception of tubing or hose means as hereinafter described. The mounting adaptor 30 of cleaning station A-3 differs from the adaptors of cleaning stations A-1 and A-2 in that there is no support standard 36 provided thereon.

It will be appreciated that the first and second pairs 18, 18 and 19, 19 of teat-cups of each of the claws 17 are frictionally received within the first and second pairs of tubular arms 33, 33 and 34, 34 of corresponding teat-cup mounting adaptors 30 so as to suspend the respective claws 17 in inverted position from the rack 23 with each of the mounting adaptors 30 disposed in straddling relationship across the rack bar 24. The first and second pairs of tubular arms 33, 33 and 34, 34 depend from the tubular base 31 of each mounting adaptor 30 on opposite sides of the rack bar 24 with the corresponding first and second pairs of teat-cups 18, 18 and 19, 19 releasably secured therein in fluid-tight sealing relationship, as in FIGURE 4.

Tubing means are provided to connect each of the teat-cup cleaning stations A-1, A-2, and A-3 in series with the milk pipe-line 12 and the vacuum pipe-line 10 through the milk-receiving jar 15, such tubing means comprising a suction tube 50, connector tubes 51 and 52, and connector hose 53. One end of the suction tube 50 is disposed in the receptacle 21 beneath the level of cleaning liquid contained therein and its other end is attached to the claw 17 of cleaning station A-1. Cleaning station A-1 is connected to cleaning station A-2 by means of connector tube 51 which has one end frictionally received about the vertical tubular projection 35 on the mounting adaptor 30 of station A-1 and its opposite end attached to the claw 17 of station A-2. It will be noted that a portion of the connector tube 51 is received by the support standard 36 on the mounting adaptor 30 of station A-1 to prevent kinking thereof. Similarly, connector tube 52 is attached at one end to the vertical projection 35 of the mounting adaptor 30 of cleaning station A-2 and the opposite end of the connector tube 52 is attached to the claw 17 of the cleaning station A-3, a portion of the connector tube 52 being received by the support standard 36 on the mounting adaptor 30 of station A-2. The connector hose 53 is connected at one end to the vertical projection 35 of mounting adaptor 30 in the cleaning station A-3, which represents an end cleaning station in the series thereof, and the other end of the connector hose 53 is connected to the milk pipe-line 12. Valve means in the form of a manually operable stopcock 54 may be interposed between the mounting adaptor 30 of cleaning station A-3 and the connector hose 53 to open or shut off communication therebetween. The stopcock 54 is turned to "open" position when the apparatus is prepared for operation.

Thus, upon inducing a vacuum in the vacuum pipe-line 10 by operating the vacuum pump 11, a suction effect is created at the end of the suction tube 50 immersed below the level of cleaning liquid in the receptacle 21 of tank 20 to draw cleaning liquid through the suction tube 50 and progressively through each of the cleaning stations A-1, A-2, and A-3, the connector hose 53, and the milk pipe-line 12. From the milk pipe-line 12, the cleaning liquid is drawn into the milk-receiving jar 15 and thereafter returned through a discharge tube 55 to the receptacle 21 to provide continuous cycling of the cleaning liquid in the pipe-line milking system to effect a substantial flushing action on each cleaning station in the series thereof to render the claws 17 and their first and second pairs of teat-cups 18, 18 and 19, 19 clean. Having passed the cleaning liquid in receptacle 21 through the series of teat-cup cleaning stations, the suction tube 50 and the discharge tube 55 may be transferred to the receptacle 22 of the tank 30, whereupon a rinse solution or sterilizing liquid may be conducted through the series of teat-cup cleaning stations in the manner previously described.

It is contemplated that the suction tube 50 and connector tubes 51 and 52 may comprise milk hoses of the pipe-line milking system which are respectively attached at one end to the milk pipe-line 12 at various positions therealong corresponding to individual milking sites and at the other end to the respective teat-cup assemblies or claws 17 at points remote from the teat-cups 18, 18 and 19, 19 thereof during a milking operation such as previously described. In such an instance, the passage of cleaning liquid and a rinse solution or sterilizing liquid through the series of teat-cup cleaning stations is also effective to clean and sterilize the individual milk hoses associated with the teat-cup assemblies or claws 17 as well. The suspension of claws 17 from the rack 23 in inverted position further enhances the effectiveness of our apparatus in cleaning the individual teat-cups 18, 18 and 19, 19 of the claws 17 by causing the cleaning liquid to flow through each of the claws 17 and its respective teat-cups 18, 18 and 19, 19 in a direction opposite from the direction in which milk from animals is drawn through the teat-cups 18, 18 and 19, 19 of each claw 17. Since milk sediment accumulating in parts of a pipe-line milking system will tend to assume a pattern corresponding to the direction of flow of the milk through such parts, the reverse direction of flow imparted to the cleaning liquid in our apparatus produces a "stripping" effect on the milk sediment in the claws 17 and their teat cups accompanying the flushing action of the cleaning liquid as it passes therethrough, whereby the milk sediment is readily dislodged from the claws 17 and their teat-cups 18, 18 and 19, 19. It will be apparent that the teat-cup unit B may be cleaned and sterilized in the same fashion as heretofore described.

It will be understood that the number of individual claws 17 which may be accommodated by the present apparatus may be varied as desired by adding or subtracting teat-cup mounting adaptors 30 as necessary to correspond with the number of claws 17 to be cleaned. The ready portability of the light-weight teat-cup mounting adaptors 30 which may be made of suitable metals or plastics facilitates the addition or subtraction of these mounting adaptors 30 to correspond with the number of claws 17 to be cleaned and sterilized in any given operation without detracting from the effectiveness of the apparatus in thoroughly sanitizing the individual pairs of teat-cups 18, 18 and 19, 19 of the respective claws 17. In most instances, the addition or subtraction of teat-cup mounting adaptors 30 in the assembly of the apparatus may be accomplished without physical movement of the adaptors 30 onto or off of the rack bar 24 by merely connecting or disconnecting claws 17 to or from respective adaptors 30 mounted on the rack bar 24 and connecting the desired number of teat-cup cleaning stations in series by appropriate tubing means. Where less than the total number of adaptors 30 mounted on the rack bar 24 are incorporated in a given assembly of the apparatus, the adaptors 30 which are not in use may remain mounted in straddling relation on the rack bar 24 so that these adaptors 30 will be readily available for use in a subsequent assembly of the apparatus requiring more teat-cup cleaning stations.

Thus, it will be seen that we have disclosed an improved apparatus for cleaning and sterilizing teat-cup assemblies and pipe-lines in a pipe-line milking system, whereby the suction effect created in the tubing means of our cleaning apparatus provides proper flushing action on the part of cleaning and sterilizing liquids for each of the teat-cup assemblies to dislodge milk sediment from the teat cups thereof which otherwise might remain lodged in the teat cups. Although described as being incorporated in a pipe-line milking system, our apparatus may be employed within the spirit of this invention apart from the milking system itself for cleaning disassembled components thereof, such as teat-cup assemblies, by providing appropriate tubing and a vacuum-inducing source, such as a vacuum pump, independent from that used in the milking system.

In the drawings and specification there has been set forth a preferred embodiment of the invention and, although specific terms are employed, they are used in a generic and descriptive sense only and not for purposes of limitation, the scope of the invention being defined in the claims.

We claim:

1. In a pipe-line milking system of the type having a milk pipe-line, at least one teat-cup assembly comprising a plurality of teat cups for communicative connection to said milk pipe-line, a vacuum pipe-line connected to said milk pipe-line, and means for inducing a vacuum in said vacuum pipe-line to create a suction effect in said plurality of teat cups extending through said teat-cup assembly and said milk pipe-line wherein milk is drawn into said milk pipe-line through said teat cups; an apparatus for cleaning said teat cup assembly and said milk pipe-line, said apparatus comprising a tank adapted to contain a supply of cleaning liquid, tubular adaptor means adapted to removably receive each of said teat cups of said teat-cup assembly in fluid-tight relationship, and tubing means adapted to extend into the cleaning liquid in said tank and to connect said teat-cup assembly and said tubular adaptor means to said milk pipe-line, whereby cleaning liquid is adapted to be drawn from said tank through said tubing means, teat-cup assembly, teat cups, tubular adaptor means and milk pipe-line in response to the inducing of a vacuum in said vacuum pipe-line.

2. An apparatus for cleaning a teat-cup unit of a milking machine wherein said teat-cup unit comprises a plurality of claws, and each of said claws has first and second pairs of teat cups; said apparatus comprising a tank adapted to contain a supply of cleaning liquid, tubular adaptor means for each of said claws adapted to removably receive the first and second pairs of teat cups of said claw in fluid-tight relationship, each of said tubular adaptor means and the respective claw to be associated therewith comprising a teat-cup cleaning station, tubing means adapted to extend into the cleaning liquid in said tank and to connect said teat-cup cleaning stations in series, and means inducing suction in said tubing means in a direction for drawing cleaning liquid from said tank through each of said teat-cup cleaning stations.

3. In a pipe-line milking system of the type having a milk pipe-line, a teat-cup unit comprising a plurality of claws for communicative connection to said milk pipe-line, each of said claws having first and second pairs of teat cups, a vacuum pipe-line connected to said milk pipe-line, and means for inducing a vacuum in said vacuum pipe-line to create a suction effect in said plurality of teat cups extending through said claws of said teat-cup unit and said milk pipe-line wherein milk is drawn into said milk pipe-line through said teat cups; an apparatus for cleaning said teat-cup unit and said milk pipe-line, said apparatus comprising a tank adapted to contain a supply of cleaning liquid, tubular adaptor means for each of said claws adapted to removably receive the first and second pairs of teat cups of said claw in fluid-tight relationship, each of said tubular adaptor means and the respective claw to be associated therewith comprising a teat-cup cleaning station, and tubing means adapted to extend into the cleaning liquid in said tank and to connect said teat-cup cleaning stations in series to said milk pipe-line, whereby cleaning liquid is adapted to be drawn from said tank through said tubing means, each of said teat-cup cleaning stations, and said milk pipe-line in response to the inducing of a vacuum in said vacuum pipe-line.

4. In a pipe-line milking system of the type having a milk pipe-line, a teat-cup unit comprising a plurality of claws for communicative connection to said milk pipe-line, each of said claws having first and second pairs of teat cups, a vacuum pipe-line connected to said milk pipe-line, and means for inducing a vacuum in said vacuum pipe-line to create a suction effect in said plurality of teat cups extending through said claws of said teat-cup unit and said milk pipe-line wherein milk is drawn into said milk pipe-line through said teat cups; an apparatus for cleaning said teat cup unit and said milk pipe-line, said apparatus comprising a tank adapted to contain a supply of cleaning fluid, a rack disposed above said tank, a plurality of teat-cup mounting adaptors corresponding in number to the plurality of claws and straddling said rack for supporting said teat-cup unit above said tank in depending relation from said rack; each of said adaptors comprising a tubular base overlying said rack and in engagement therewith, first and second pairs of tubular arms depending from said base on opposite sides of said rack and extending beneath said rack, said first and second pairs of tubular arms being adapted to removably receive the first and second pairs of teat cups of a corresponding claw in fluid-tight relationship to suspend said claw in inverted position from said rack; each of said teat-cup mounting adaptors and the claw corresponding thereto comprising a teat-cup cleaning station, means providing communication between adjacent teat-cup cleaning stations comprising a tube having one end attached to the mounting adaptor of one station and its opposite end adapted to be attached to the claw of the adjacent station for connecting said teat-cup cleaning stations in series, one end of the series of teat-cup cleaning stations being adapted to be communicatively connected to said milk pipe-line, and a suction tube adapted to extend into the cleaning liquid in said tank and to be connected to the other end of the series of teat-cup cleaning stations, whereby cleaning liquid is adapted to be drawn from said tank through said suction tube, each of said teat-cup cleaning stations, and said milk pipe-line in response to the inducing of a vacuum in said vacuum pipe-line.

References Cited in the file of this patent

UNITED STATES PATENTS

| | | | |
|---|---|---|---|
| Re. 19,335 | Uroukoff | Oct. 2, | 1934 |
| 643,685 | Saunders | Feb. 20, | 1900 |
| 2,548,788 | Helme | Apr. 10, | 1951 |
| 2,650,179 | Anderson | Aug. 25, | 1953 |
| 2,807,478 | Hermann | Sept. 24, | 1957 |